United States Patent
Buttolo et al.

(10) Patent No.: US 9,967,717 B2
(45) Date of Patent: May 8, 2018

(54) EFFICIENT TRACKING OF PERSONAL DEVICE LOCATIONS

(71) Applicant: Ford Global Technologies, LLC, Dearborn, MI (US)

(72) Inventors: Pietro Buttolo, Dearborn Heights, MI (US); James Stewart Rankin, II, Novi, MI (US); Stephen Ronald Tokish, Sylvania, OH (US); Stuart C. Salter, White Lake, MI (US); Gary Steven Strumolo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 14/842,082

(22) Filed: Sep. 1, 2015

(65) Prior Publication Data

US 2017/0064516 A1    Mar. 2, 2017

(51) Int. Cl.
*H04W 4/04* (2009.01)
*H04W 68/00* (2009.01)

(52) U.S. Cl.
CPC ......... *H04W 4/046* (2013.01); *H04W 68/005* (2013.01)

(58) Field of Classification Search
CPC .. H04W 48/04; H04K 3/415; H04K 2203/222
(Continued)

(56) References Cited

U.S. PATENT DOCUMENTS

| | | |
|---|---|---|
| 4,721,954 A | 1/1988 | Mauch |
| 4,792,783 A | 12/1988 | Burgess et al. |

(Continued)

FOREIGN PATENT DOCUMENTS

| | | |
|---|---|---|
| CN | 102445954 B | 3/2014 |
| CN | 103942963 A | 7/2014 |

(Continued)

OTHER PUBLICATIONS

Rasin, "An In-Vehicle Human-Machine Interface Module," XML Journal, Jan. 3, 2003, (9 pages), retrieved from http://xml.sys-con.com/node/40547 on Dec. 13, 2014.

(Continued)

*Primary Examiner* — Cong Tran
(74) *Attorney, Agent, or Firm* — Jennifer M. Stec; Brooks Kushman P.C.

(57) ABSTRACT

A system may include zones associated with respective seating positions of a vehicle and in-vehicle components each associated with at least one of the zones. An in-vehicle component may identify a personal device associated with the zone of the in-vehicle component by identifying a personal device associated with the zone of the in-vehicle component by determining average signal strength between the personal device and the in-vehicle components of each zone, and identifying for which zone the average signal strength is highest, and sending a notification to the personal device responsive to a detected user interaction. A method may include detecting user interaction to an in-vehicle component of a zone; acquiring signal strength intensity information of personal devices from other in-vehicle components of the zone; calculating average signal strengths of the personal devices to the in-vehicle components; associating one of the personal devices to the zone as having a highest average signal strength to the in-vehicle components of the zone; and sending a notification to the one of the personal devices.

20 Claims, 4 Drawing Sheets

(58) Field of Classification Search
USPC .............. 455/418–420, 414.1, 456.16, 457
See application file for complete search history.

(56) References Cited

U.S. PATENT DOCUMENTS

| | | | |
|---|---|---|---|
| 4,962,302 A | 10/1990 | Katsumi | |
| 5,132,880 A | 7/1992 | Kawamura | |
| 5,143,437 A | 9/1992 | Matsuno et al. | |
| 5,255,442 A | 10/1993 | Schierbeek et al. | |
| 5,543,591 A | 8/1996 | Gillespie et al. | |
| 5,648,656 A | 7/1997 | Begemann et al. | |
| 5,650,929 A | 7/1997 | Potter et al. | |
| 5,697,844 A | 12/1997 | Von Kohorn | |
| 5,757,268 A | 5/1998 | Toffolo et al. | |
| 5,796,179 A | 8/1998 | Honaga | |
| 5,848,634 A | 12/1998 | Will et al. | |
| 5,850,174 A | 12/1998 | DiCroce et al. | |
| 6,028,537 A | 2/2000 | Suman et al. | |
| 6,377,860 B1 | 4/2002 | Gray et al. | |
| 6,397,249 B1 | 5/2002 | Cromer et al. | |
| 6,449,541 B1 | 9/2002 | Goldberg et al. | |
| 6,473,038 B2 | 10/2002 | Patwari et al. | |
| 6,536,928 B1 | 3/2003 | Hein et al. | |
| 6,935,763 B2 | 8/2005 | Mueller et al. | |
| 7,009,504 B1 | 3/2006 | Banter et al. | |
| 7,015,791 B2 | 3/2006 | Huntzicker | |
| 7,015,896 B2 | 3/2006 | Levy et al. | |
| 7,034,655 B2 | 4/2006 | Magner et al. | |
| 7,342,325 B2 | 3/2008 | Rhodes | |
| 7,502,620 B2 | 3/2009 | Morgan et al. | |
| 7,595,718 B2 | 9/2009 | Chen | |
| 7,672,757 B2 | 3/2010 | Hong et al. | |
| 7,706,740 B2 | 4/2010 | Collins et al. | |
| 7,778,651 B2 | 8/2010 | Billhartz | |
| 7,800,483 B2 | 9/2010 | Bucher | |
| 7,810,969 B2 | 10/2010 | Blackmore et al. | |
| 7,973,773 B2 | 7/2011 | Pryor | |
| 8,065,169 B1 | 11/2011 | Oldham et al. | |
| 8,073,589 B2 | 12/2011 | Rasin et al. | |
| 8,324,910 B2 | 12/2012 | Lamborghini et al. | |
| 8,344,850 B2 | 1/2013 | Girard, III et al. | |
| 8,408,766 B2 | 4/2013 | Wilson et al. | |
| 8,417,258 B2 | 4/2013 | Barnes, Jr. | |
| 8,421,589 B2 | 4/2013 | Sultan et al. | |
| 8,447,598 B2 | 5/2013 | Chutorash et al. | |
| 8,476,832 B2 | 7/2013 | Prodin et al. | |
| 8,482,430 B2 | 7/2013 | Szczerba | |
| 8,768,565 B2 | 7/2014 | Jefferies et al. | |
| 8,797,295 B2 | 8/2014 | Bernstein et al. | |
| 8,823,517 B2 | 9/2014 | Hadsall, Sr. | |
| 8,831,514 B2 | 9/2014 | Tysowski | |
| 8,856,543 B2 | 10/2014 | Geiger et al. | |
| 8,866,604 B2 | 10/2014 | Rankin et al. | |
| 8,873,147 B1 | 10/2014 | Rhodes et al. | |
| 8,873,841 B2 | 10/2014 | Yang et al. | |
| 8,880,100 B2 | 11/2014 | Dobyns | |
| 8,930,045 B2 | 1/2015 | Oman et al. | |
| 8,947,202 B2 | 2/2015 | Tucker et al. | |
| 9,053,516 B2 | 6/2015 | Stempora | |
| 9,078,200 B2 | 7/2015 | Wuergler et al. | |
| 9,104,537 B1 | 8/2015 | Penilla et al. | |
| 9,164,588 B1 | 10/2015 | Johnson et al. | |
| 9,288,270 B1 | 3/2016 | Penilla et al. | |
| 9,350,809 B2 | 5/2016 | Leppanen | |
| 9,357,054 B1 | 5/2016 | Froment et al. | |
| 9,417,691 B2 | 8/2016 | Belimpasakis et al. | |
| 2002/0069002 A1 | 6/2002 | Morehouse | |
| 2002/0070923 A1 | 6/2002 | Levy et al. | |
| 2002/0087423 A1 | 7/2002 | Carbrey Palango et al. | |
| 2002/0092019 A1 | 7/2002 | Marcus | |
| 2002/0096572 A1 | 7/2002 | Chene et al. | |
| 2002/0178385 A1 | 11/2002 | Dent et al. | |
| 2002/0197976 A1 | 12/2002 | Liu et al. | |
| 2003/0078709 A1 | 4/2003 | Yester et al. | |
| 2003/0171863 A1 | 9/2003 | Plumeier et al. | |
| 2004/0034455 A1 | 2/2004 | Simonds et al. | |
| 2004/0076015 A1 | 4/2004 | Aoki et al. | |
| 2004/0141634 A1 | 7/2004 | Yamamoto et al. | |
| 2004/0215532 A1 | 10/2004 | Boman et al. | |
| 2005/0040933 A1 | 2/2005 | Huntzicker | |
| 2005/0044906 A1 | 3/2005 | Spielman | |
| 2005/0099320 A1 | 5/2005 | Nath et al. | |
| 2005/0136845 A1 | 6/2005 | Masuoka et al. | |
| 2005/0185399 A1 | 8/2005 | Beermann et al. | |
| 2005/0261807 A1 | 11/2005 | Sorensen et al. | |
| 2005/0261815 A1 | 11/2005 | Cowelchuk et al. | |
| 2005/0288837 A1 | 12/2005 | Wiegand et al. | |
| 2006/0075934 A1 | 4/2006 | Ram | |
| 2006/0089755 A1 | 4/2006 | Ampunan et al. | |
| 2006/0155429 A1 | 7/2006 | Boone et al. | |
| 2006/0155547 A1 | 7/2006 | Browne et al. | |
| 2006/0205456 A1 | 9/2006 | Bentz et al. | |
| 2006/0250217 A1 | 11/2006 | Hamling et al. | |
| 2006/0258377 A1 | 11/2006 | Economos et al. | |
| 2006/0271261 A1 | 11/2006 | Flores et al. | |
| 2007/0021885 A1 | 1/2007 | Soehren | |
| 2007/0140187 A1 | 6/2007 | Rokusek et al. | |
| 2007/0180503 A1 | 8/2007 | Li et al. | |
| 2007/0198472 A1 | 8/2007 | Simonds et al. | |
| 2007/0201389 A1 | 8/2007 | Murayama | |
| 2007/0262140 A1 | 11/2007 | Long, Sr. | |
| 2008/0140868 A1 | 6/2008 | Kalayjian et al. | |
| 2008/0180231 A1 | 7/2008 | Chen | |
| 2008/0261643 A1 | 10/2008 | Bauer et al. | |
| 2008/0288406 A1 | 11/2008 | Seguin et al. | |
| 2009/0249081 A1 | 10/2009 | Zayas | |
| 2009/0253439 A1 | 10/2009 | Gantner et al. | |
| 2010/0091394 A1 | 4/2010 | DeWind et al. | |
| 2010/0171696 A1 | 7/2010 | Wu | |
| 2010/0176917 A1 | 7/2010 | Bacarella | |
| 2010/0197359 A1 | 8/2010 | Harris | |
| 2010/0216401 A1 | 8/2010 | Kitahara | |
| 2010/0222939 A1 | 9/2010 | Namburu et al. | |
| 2010/0225443 A1 | 9/2010 | Bayram et al. | |
| 2010/0231958 A1 | 9/2010 | Okigami | |
| 2010/0233957 A1 | 9/2010 | Dobosz | |
| 2010/0235045 A1 | 9/2010 | Craig et al. | |
| 2010/0280711 A1 | 11/2010 | Chen et al. | |
| 2010/0315373 A1 | 12/2010 | Steinhauser et al. | |
| 2011/0086668 A1 | 4/2011 | Patel | |
| 2011/0137520 A1 | 6/2011 | Rector et al. | |
| 2011/0187496 A1 | 8/2011 | Denison et al. | |
| 2011/0199298 A1 | 8/2011 | Bassompiere et al. | |
| 2011/0219080 A1* | 9/2011 | McWithey | H04M 1/72552 709/206 |
| 2011/0264491 A1 | 10/2011 | Birnbaum et al. | |
| 2012/0006611 A1* | 1/2012 | Wallace | H04M 1/67 180/272 |
| 2012/0032899 A1 | 2/2012 | Waeller et al. | |
| 2012/0065815 A1 | 3/2012 | Hess | |
| 2012/0096908 A1 | 4/2012 | Fuse | |
| 2012/0098768 A1 | 4/2012 | Bendewald et al. | |
| 2012/0109451 A1* | 5/2012 | Tan | G01C 21/3664 701/36 |
| 2012/0136802 A1 | 5/2012 | McQuade et al. | |
| 2012/0154114 A1 | 6/2012 | Kawamura | |
| 2012/0214463 A1 | 8/2012 | Smith et al. | |
| 2012/0214471 A1* | 8/2012 | Tadayon | H04M 3/53 455/418 |
| 2012/0229253 A1 | 9/2012 | Kolar | |
| 2012/0244883 A1* | 9/2012 | Tibbitts | H04W 48/04 455/456.2 |
| 2012/0254809 A1 | 10/2012 | Yang et al. | |
| 2012/0268235 A1* | 10/2012 | Farhan | G05B 23/0278 340/3.1 |
| 2012/0268242 A1 | 10/2012 | Tieman et al. | |
| 2013/0015951 A1 | 1/2013 | Kuramochi et al. | |
| 2013/0037252 A1* | 2/2013 | Major | B60H 1/00842 165/202 |
| 2013/0079951 A1 | 3/2013 | Brickman | |
| 2013/0099892 A1 | 4/2013 | Tucker et al. | |
| 2013/0116012 A1 | 5/2013 | Okayasu | |
| 2013/0218371 A1 | 8/2013 | Simard et al. | |
| 2013/0227647 A1 | 8/2013 | Thomas et al. | |

(56) References Cited

U.S. PATENT DOCUMENTS

| | | |
|---|---|---|
| 2013/0259232 A1 | 10/2013 | Petel |
| 2013/0261871 A1 | 10/2013 | Hobbs et al. |
| 2013/0283202 A1 | 10/2013 | Zhou et al. |
| 2013/0295908 A1* | 11/2013 | Zeinstra ............... H04W 4/046 455/418 |
| 2013/0300608 A1 | 11/2013 | Margalef et al. |
| 2013/0329111 A1 | 12/2013 | Desai et al. |
| 2013/0335222 A1 | 12/2013 | Comerford et al. |
| 2013/0342379 A1 | 12/2013 | Bauman et al. |
| 2014/0043152 A1 | 2/2014 | Lippman et al. |
| 2014/0068713 A1 | 3/2014 | Nicholson et al. |
| 2014/0121883 A1 | 5/2014 | Shen et al. |
| 2014/0139454 A1 | 5/2014 | Mistry et al. |
| 2014/0142783 A1 | 5/2014 | Grimm et al. |
| 2014/0163774 A1 | 6/2014 | Demeniuk |
| 2014/0164559 A1 | 6/2014 | Demeniuk |
| 2014/0200736 A1 | 7/2014 | Silvester |
| 2014/0212002 A1 | 7/2014 | Curcio et al. |
| 2014/0213287 A1 | 7/2014 | MacDonald et al. |
| 2014/0215120 A1 | 7/2014 | Saylor et al. |
| 2014/0226303 A1 | 8/2014 | Pasdar |
| 2014/0258727 A1 | 9/2014 | Schmit et al. |
| 2014/0277935 A1 | 9/2014 | Daman et al. |
| 2014/0279744 A1 | 9/2014 | Evans |
| 2014/0309806 A1 | 10/2014 | Ricci |
| 2014/0321321 A1 | 10/2014 | Knaappila |
| 2014/0335902 A1* | 11/2014 | Guba ................... H04W 4/027 455/456.4 |
| 2014/0375477 A1 | 12/2014 | Jain et al. |
| 2014/0379175 A1 | 12/2014 | Mittermeier |
| 2014/0380442 A1 | 12/2014 | Addepalli et al. |
| 2015/0039877 A1 | 2/2015 | Hall et al. |
| 2015/0048927 A1 | 2/2015 | Simmons |
| 2015/0094088 A1 | 4/2015 | Chen |
| 2015/0116085 A1 | 4/2015 | Juzswik |
| 2015/0116100 A1 | 4/2015 | Yang et al. |
| 2015/0123762 A1 | 5/2015 | Park et al. |
| 2015/0126171 A1* | 5/2015 | Miller ................... H04L 67/125 455/418 |
| 2015/0147974 A1 | 5/2015 | Tucker et al. |
| 2015/0148990 A1 | 5/2015 | Patel |
| 2015/0149042 A1* | 5/2015 | Cooper ................ B60R 16/037 701/48 |
| 2015/0154531 A1 | 6/2015 | Skaaksrud |
| 2015/0172902 A1 | 6/2015 | Kasslin et al. |
| 2015/0178034 A1 | 6/2015 | Penilla et al. |
| 2015/0181014 A1 | 6/2015 | Gerhardt et al. |
| 2015/0204965 A1 | 7/2015 | Magarida et al. |
| 2015/0210287 A1* | 7/2015 | Penilla ................. B60W 40/08 701/49 |
| 2015/0223151 A1 | 8/2015 | Lei et al. |
| 2015/0256668 A1* | 9/2015 | Atkinson ............ H04M 1/6075 455/418 |
| 2015/0261219 A1 | 9/2015 | Cuddihy et al. |
| 2015/0261573 A1 | 9/2015 | Rausch et al. |
| 2015/0269797 A1 | 9/2015 | Kauffmann et al. |
| 2015/0278164 A1 | 10/2015 | Kim et al. |
| 2015/0283914 A1 | 10/2015 | Malone et al. |
| 2015/0294518 A1 | 10/2015 | Peplin et al. |
| 2015/0332530 A1 | 11/2015 | Kishita |
| 2015/0352953 A1 | 12/2015 | Koravadi |
| 2015/0356797 A1 | 12/2015 | McBride et al. |
| 2015/0382160 A1 | 12/2015 | Slay, Jr. et al. |
| 2016/0039430 A1 | 2/2016 | Ricci |
| 2016/0055699 A1 | 2/2016 | Vincenti |
| 2016/0119782 A1 | 4/2016 | Kim |
| 2016/0133072 A1 | 5/2016 | Santavicca |
| 2016/0203661 A1 | 7/2016 | Pudar et al. |
| 2016/0214572 A1 | 7/2016 | Snider |
| 2016/0248905 A1* | 8/2016 | Miller ................... H04W 4/008 |
| 2016/0332535 A1 | 11/2016 | Bradley et al. |
| 2016/0360382 A1 | 12/2016 | Gross et al. |

FOREIGN PATENT DOCUMENTS

| | | |
|---|---|---|
| JP | 2011131833 A | 7/2011 |
| WO | 2013052043 A1 | 4/2013 |

OTHER PUBLICATIONS

Shahzada, "Touch Interaction for User Authentication," Thesis, Carleton University, Ottawa, Ontario, May 2014 (124 pages).

Napa Sae-Bae et al., "Biometric-Rich Gestures: A Novel Approach to Authentication on Multi-touch Devices," NYU-Poly, CHI 2012, May 5-10, 2012, Austin, TX (10 pages).

Services-Bluetooth Development Portal, last accessed May 30, 2015, https://developer.bluetooth.org/gatt/services/Pages/ServicesHome.aspx. (1 page).

Azad, "The Quick Guide to GUIDs," Better Explained—Math insights that click, last accessed May 24, 2015, http://betterexplained.com/articles (15 pages).

Goodwin, "Add-on module auto-unlocks your car when your phone is near," CNET, Car Tech, Nov. 19, 2013, http://www.cnet.com/news/add-on-module-auto-unlocks-your-car-when-your-phone-is-near (2 pages).

Hertz 24/7, "Book. Unlock. Go. You can reserve your vehicle anywhere, anytime—up to 10 days in advance," last accessed Jul. 28, 2015, https://www.hertz247.com/parkridge/en-us/About (3 pages).

Klosowski, "Unlock Your Car with a Bluetooth Powered Keyless Entry System," Lifehacker, Sep. 30, 2013, http://lifehacker.com/unlock-your-car-with-a-bluetooth-powered-keyless-entry-1427088798 (2 pages).

Toyota, Toyota Prius C Brochure, 2015, available at http://www.toyota.com/priusc/ebrochure.

Thomas, "2010 Toyota Prius Touch Tracer Display," Mar. 3, 2009, available at https://www.cars.com/articles/2009/03/2010-toyota-prius-touch-tracer-display/.

Gahran, "Vehicle owner's manuals—now on smartphones," CNN.com, Jan. 31, 2011, available at http://www.cnn.com/2011/TECH/mobile/01/31/car.manual.phone/.

Specification of the Bluetooth System, Version 4.2, "Master Table of Contents & Compliance Requirements," Dec. 2, 2014, https://www.bluetooth.or/en-us/specification/adopted-specifications. (2,772 pages).

General Motors Corporation; Pontiac GTO Owner's Manual; 2005; pp. 3-19 and 3-20; https://my.gm.com/content/dam/gmownercenter/gmna/dynamic/manuals/2006/pontiac/gto/2006_gto_owners.pdf.

Bargshady et al., Precise Tracking of Things via Hybrid 3-D Fingerprint Database and Kernel Method Particle Filter, 2016, IEEE, p. 8963-8971.

Murugappan et al., Wireless EEG Signals based Neuromarketing System using Fast Fourier Transform (FFT), 2014, IEEE, p. 25-30.

Katoh et al., A Method of Advertisement Selection in Multiple RFID-Tags Sensor Network for a Ubiquitous Wide-Area Advertising Service, 2008, IEEE, p. 519-524.

* cited by examiner

EFFICIENT TRACKING OF PERSONAL DEVICE LOCATIONS

TECHNICAL FIELD

Aspects of the disclosure generally relate to efficient tracking of personal device locations within the vehicle cabin.

BACKGROUND

Sales of personal devices, such as smartphones and wearables, continue to increase. Thus, more personal devices are brought by users into the automotive context. Smartphones can already be used in some vehicle models to access a wide range of vehicle information, to start the vehicle, and to open windows and doors. Some wearables are capable of providing real-time navigation information to the driver. Device manufacturers are implementing frameworks to enable a more seamless integration of their brand of personal devices into the driving experience.

SUMMARY

In a first illustrative embodiment, a system includes vehicle seating having zones associated with seating positions; and in-vehicle components, each associated with at least one of the zones, one of the in-vehicle components programmed to identify a personal device associated with the zone of the in-vehicle component by determining average signal strength between the personal device and the in-vehicle components of each zone, and identifying for which zone the average signal strength is highest, and send a notification to the personal device responsive to a detected user interaction.

In a second illustrative embodiment, a system includes an in-vehicle component, associated with a zone seating position of a vehicle, programmed to acquire wireless signal strength intensity information of a personal device from other in-vehicle components; identify zones of the other in-vehicle components; calculate an average signal strength of the personal device to the in-vehicle components in each of the zones; and associate the personal device with the zone having a highest average signal strength to the personal device.

In a third illustrative embodiment, a computer-implemented method includes detecting user interaction to an in-vehicle component of a zone; acquiring signal strength intensity information of personal devices from other in-vehicle components of the zone; calculating average signal strengths of the personal devices to the in-vehicle components; associating one of the personal devices to the zone as having a highest average signal strength to the in-vehicle components of the zone; and sending a notification to the one of the personal devices.

In a fourth illustrative embodiment, a system includes vehicle seating having zones associated with seating positions; and in-vehicle components, each associated with at least one of the zones; and a personal device located in one of the zones and programmed to identify in-vehicle components associated with the zone of the personal device by determining average signal strength between the personal device and the in-vehicle components of each zone, and identifying for which zone the average signal strength is highest, and receive a notification responsive to a user interaction detected by one of the in-vehicle components of the zone.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As smartphones, tablets, and other personal devices become more powerful and interconnected, there is an opportunity to integrate more intelligence and sensing into components of the vehicle interior. Traditional vehicle interior modules, such as reading lights or speakers, may be enhanced with a communication interface (such as Bluetooth Low Energy (BLE)). These enhanced modules of the vehicle interior may be referred to as in-vehicle components. The vehicle occupants may utilize their personal devices to control features of the in-vehicle components by connecting their personal devices to the in-vehicle components over the communications interface. In an example, a vehicle occupant may utilize an application installed to the personal device to turn the reading light on or off, or to adjust a volume of the speaker.

In many cases, it may be desirable for a vehicle occupant to be able to control the in-vehicle components that relate to the seat in which the vehicle occupant is located. A zone-coding approach may be utilized to allow the in-vehicle components to identify which personal devices should control which in-vehicle components. In the zone-coding approach, the vehicle interior may be subdivided into zones, where each zone relates to a seating position of the vehicle. Each of the in-vehicle components may be assigned to the zone or zones in which the respective in-vehicle components are located and/or control. The personal devices may receive signal strength information received from the communication interface of the in-vehicle components. Conversely, the in-vehicle components may receive signal strength information from the in-vehicle devices to the personal device of the vehicle occupant using the communication interfaces in-vehicle components. Using the signal strength information, the personal device may be assigned to the zone of the vehicle in which the average signal strength between the personal device and the in-vehicle components is the highest. Accordingly, when one of the in-vehicle components receives an indication of a user interaction with its controls, the in-vehicle component may send a notification to the personal device that is associated with the same zone as the in-vehicle component with which the user is interacting. Further aspects of the zone-coding approach are discussed in detail below.

Figure 1A:
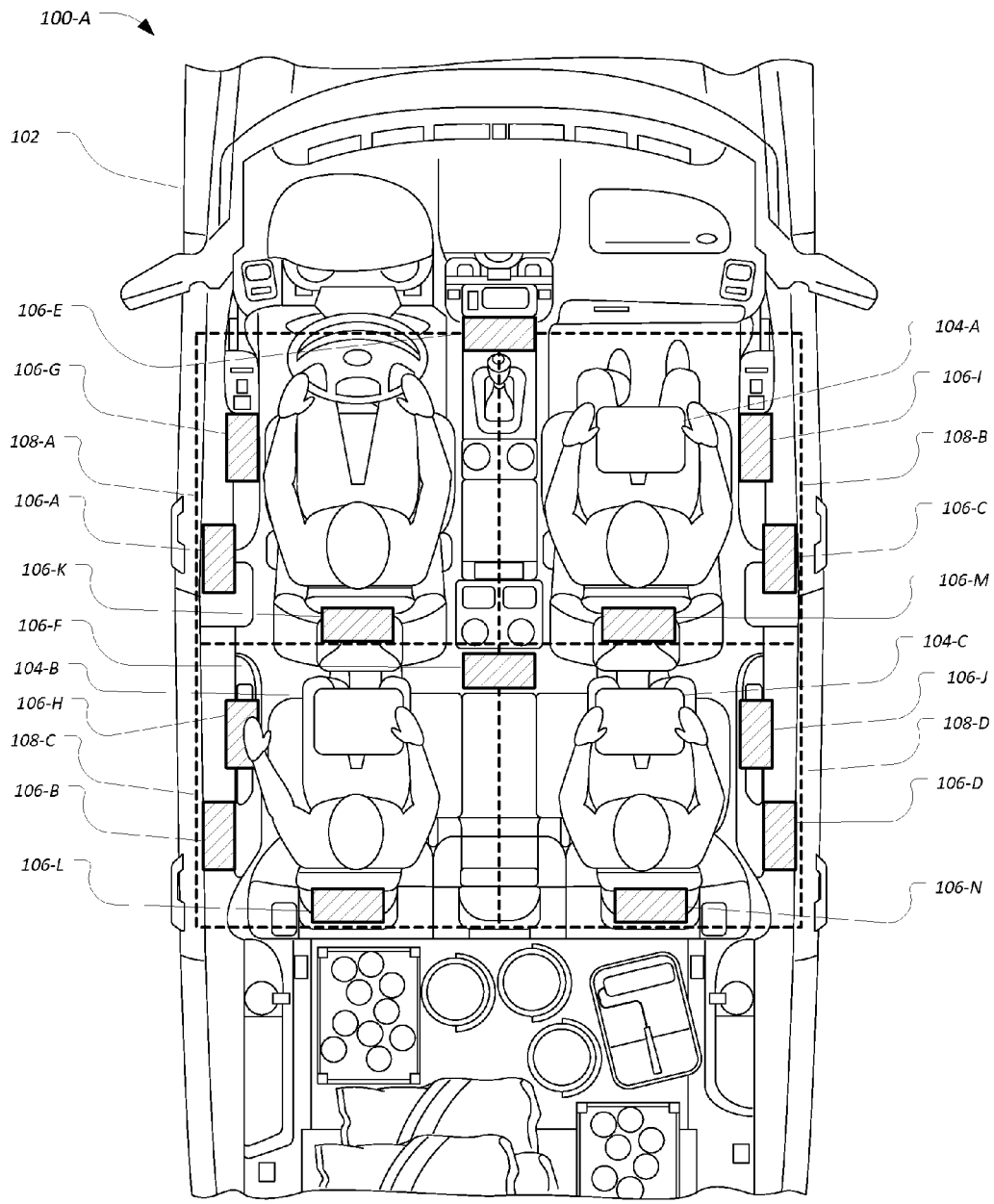
FIG. 1A illustrates an example system including a vehicle having a mesh of in-vehicle components configured to interact with vehicle occupant and user devices.

FIG. 1A illustrates an example system 100 including a vehicle 102 having a mesh of in-vehicle components 106 configured to interact with users and personal devices 104 of the users. The system 100 may be configured to allow the users, such as vehicle occupants, to seamlessly interact with the in-vehicle components 106 in the vehicle 102 or with any other framework-enabled vehicle 102. Moreover, the interaction may be performed without requiring the personal devices 104 to have been paired with or be in communication with a head unit or other centralized computing platform of the vehicle 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The personal devices 104-A, 104-B and 104-C (collectively 104) may include mobile devices of the users, and/or wearable devices of the users. The mobile devices may be any of various types of portable computing device, such as cellular phones, tablet computers, smart watches, laptop computers, portable music players, or other devices capable of networked communication with other mobile devices. The wearable devices may include, as some non-limiting examples, smartwatches, smart glasses, fitness bands, control rings, or other personal mobility or accessory device designed to be worn and to communicate with the user's mobile device.

The in-vehicle components 106-A through 106-N (collectively 106) may include various elements of the vehicle 102 having user-configurable settings. These in-vehicle components 106 may include, as some examples, overhead light in-vehicle components 106-A through 106-D, climate control in-vehicle components 106-E and 106-F, seat control in-vehicle components 106-G through 106-J, and speaker in-vehicle components 106-K through 106-N. Other examples of in-vehicle components 106 are possible as well, such as rear seat entertainment screens or automated window shades. In many cases, the in-vehicle component 106 may expose controls such as buttons, sliders, and touchscreens that may be used by the user to configure the particular settings of the in-vehicle component 106. As some possibilities, the controls of the in-vehicle component 106 may allow the user to set a lighting level of a light control, set a temperature of a climate control, set a volume and source of audio for a speaker, and set a position of a seat.

The vehicle 102 interior may be divided into multiple zones 108, where each zone 108 may be associated with a seating position within the vehicle 102 interior. For instance, the front row of the illustrated vehicle 102 may include a first zone 108-A associated with the driver seating position, and a second zone 108-B associated with a front passenger seating position. The second row of the illustrated vehicle 102 may include a third zone 108-C associated with a driver-side rear seating position and a fourth zone 108-D associated with a passenger-side rear seating position. Variations on the number and arrangement of zones 108 are possible. For instance, an alternate second row may include an additional fifth zone 108 of a second-row middle seating position (not shown). Four occupants are illustrated as being inside the example vehicle 102, three of whom are using personal devices 104. A driver occupant in the zone 108-A is not using a personal device 104. A front passenger occupant in the zone 108-B is using the personal device 104-A. A rear driver-side passenger occupant in the zone 108-C is using the personal device 104-B. A rear passenger-side passenger occupant in the zone 108-D is using the personal device 104-C.

Each of the various in-vehicle components 106 present in the vehicle 102 interior may be associated with the one or more of the zones 108. As some examples, the in-vehicle components 106 may be associated with the zone 108 in which the respective in-vehicle component 106 is located and/or the one (or more) of the zones 108 that is controlled by the respective in-vehicle component 106. For instance, the light in-vehicle component 106-C accessible by the front passenger may be associated with the second zone 108-B, while the light in-vehicle component 106-D accessible by passenger-side rear may be associated with the fourth zone 108-D. It should be noted that the illustrated portion of the vehicle 102 in FIG. 1A is merely an example, and more, fewer, and/or differently located in-vehicle components 106 and zones 108 may be used.

Figure 1B:
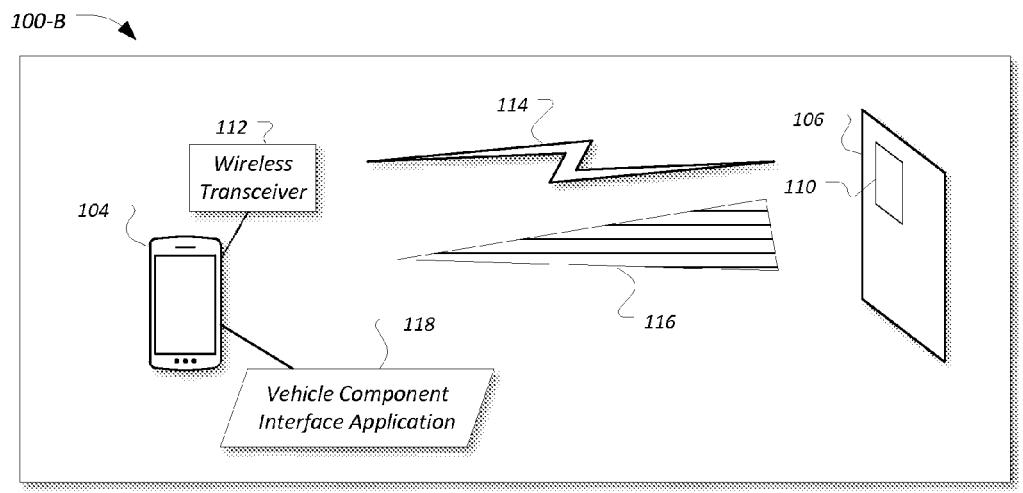
FIG. 1B illustrates an example in-vehicle component equipped with a wireless transceiver configured to facilitate detection of and identify proximity of the personal devices.

Referring to FIG. 1B, each in-vehicle component 106 may be equipped with a wireless transceiver 110 configured to facilitate detection of and identify proximity of the personal devices 104. In an example, the wireless transceiver 110 may include a wireless device, such as a Bluetooth Low Energy transceiver configured to enable low energy Bluetooth signal intensity as a locator, to determine the proximity of the personal devices 104. Detection of proximity of the personal device 104 by the wireless transceiver 110 may, in an example, cause a vehicle component interface application 118 of the detected personal device 104 to be activated.

In many examples the personal devices 104 may include a wireless transceiver 112 (e.g., a BLUETOOTH module, a ZIGBEE transceiver, a Wi-Fi transceiver, an IrDA transceiver, an RFID transceiver, etc.) configured to communicate with other compatible devices. In an example, the wireless transceiver 112 of the personal device 104 may communicate data with the wireless transceiver 110 of the in-vehicle component 106 over a wireless connection 114. In another example, a wireless transceiver 112 of a wearable personal device 104 may communicate data with a wireless transceiver 112 of a mobile personal device 104 over a wireless connection 114. The wireless connections 114 may be a Bluetooth Low Energy (BLE) connection, but other types of local wireless connection 114, such as Wi-Fi or Zigbee may be utilized as well.

The personal devices 104 may also include a device modem configured to facilitate communication of the personal devices 104 with other devices over a communications network. The communications network may provide communications services, such as packet-switched network services (e.g., Internet access, VoIP communication services), to devices connected to the communications network. An example of a communications network may include a cellular telephone network. To facilitate the communications over the communications network, personal devices 104 may be associated with unique device identifiers (e.g., mobile device numbers (MDNs), Internet protocol (IP) addresses, identifiers of the device modems, etc.) to identify the communications of the personal devices 104 over the communications network. These personal device 104 identifiers may also be utilized by the in-vehicle component 106 to identify the personal devices 104.

The vehicle component interface application 118 may be an application installed to the personal device 104. The vehicle component interface application 118 may be configured to facilitate vehicle occupant access to features of the in-vehicle components 106 exposed for networked configuration via the wireless transceiver 110. In some cases, the vehicle component interface application 118 may be configured to identify the available in-vehicle components 106, identify the available features and current settings of the identified in-vehicle components 106, and determine which of the available in-vehicle components 106 are within proximity to the vehicle occupant (e.g., in the same zone 108 as the location of the personal device 104). The vehicle component interface application 118 may be further configured to display a user interface descriptive of the available features, receive user input, and provide commands based on the user input to allow the user to control the features of the in-vehicle components 106. Thus, the system 100 may be configured to allow vehicle occupants to seamlessly interact with the in-vehicle components 106 in the vehicle 102, without requiring the personal devices 104 to have been paired with or be in communication with a heat unit of the vehicle 102.

To determine the in-vehicle components 106 that are in the same zone as the personal device 104, the system 100 may use one or more device location-tracking techniques to identify the zone 108 in which the personal device 104 is located. Location-tracking techniques may be classified depending on whether the estimate is based on proximity, angulation or lateration. Proximity methods are "coarse-grained," and may provide information regarding whether a target is within a predefined range but they do not provide an exact location of the target. Angulation methods estimate a position of the target according to angles between the target and reference locations. Lateration provide an estimate of the target location, starting from available distances between target and references. The distance of the target from a reference can be obtained from a measurement of signal strength 116 over the wireless connection 114 between the wireless transceiver 110 of the in-vehicle component 106 and the wireless transceiver 112 of the personal device 104, or from a time measurement of either arrival (TOA) or difference of arrival (TDOA).

One of the advantages of lateration using signal strength 116 is that it can leverage the already-existing received signal strength indication (RSSI) signal strength 116 information available in many communication protocols. For example, iBeacon uses the signal strength 116 information available in the Bluetooth Low-Energy (BLE) protocol to infer the distance of a beacon from a personal device 104 (i.e., a target), so that specific events can be triggered as the personal device 104 approaches the beacon. Other implementations expand on the concept, leveraging multiple references to estimate the location of the target. When the distance from three reference beacons are known, the location can be estimated in full (trilateration) from the following equations:

$$d_1^2 = (x-x_1)^2 + (y-y_1)^2 + (z-z_1)^2$$

$$d_2^2 = (x-x_2)^2 + (y-y_2)^2 + (z-z_2)^2$$

$$d_3^2 = (x-x_3)^2 + (y-y_3)^2 + (z-z_3)^2 \tag{1}$$

Figure 1C:
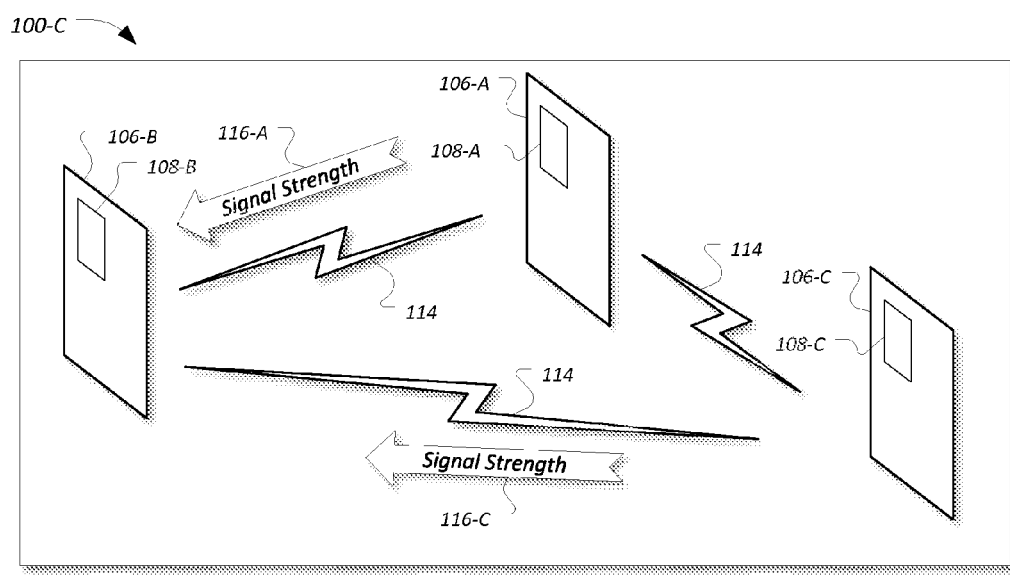
FIG. 1C illustrates an example in-vehicle component requesting signal strength from other in-vehicle components of the vehicle.

In an example, as shown in FIG. 1C, an in-vehicle component 106-B may broadcast or otherwise send a request for signal strength 116 to other in-vehicle components 106-A and 106-C of the vehicle 102. This request may cause the other in-vehicle components 106-A and 106-C to return wireless signal strength 116 data identified by their respective wireless transceiver 110 for whatever devices they detect (e.g., signal strength 116-A for the personal device 104 identified by the wireless transceiver 110-A, signal strength 116-C for the personal device 104 identified by the wireless transceiver 110-C). Using these signal strengths 116-A and 116-C, as well as signal strength 116-B determined by the in-vehicle component 106-B using its wireless transceiver 110-B, the in-vehicle component 106-B may use the equations (1) to perform trilateration and locate the personal device 104.

However, use of signal strength 116 may require calibration of a known power at a known distance. As an example, the signal power received at a distance d from a transmitter can be calculated as an attenuation of a known power $P_{d0}$ at a known distance $d_0$:

$$P_r = \frac{P_{(d_0)}}{(d/d_0)^n} \tag{2}$$

Notably, the path loss exponent n of equation (2) is a function of the environment. In dynamically changing environments, such as the interior of the vehicle 102, the value of n is neither a known nor a fixed quantity. Moreover, many different approaches to estimating distance from the signal strength 116 in the presence of unknown environmental factors require significant computational processing power.

For instance, distance may be estimated from a signal strength 116 as follows, with constant A determined by calibration:

$$\text{RSSI (dBm)} = -10n \log 10(d) + A \tag{3}$$

As a function of distance, and for n in the 2-3 range, distance d may be approximated from the reference signal as follows:

$$d = 10 \frac{RSSI}{20} k \tag{4}$$

Unless a calibration is performed, one may expect k to be within a certain range, but may be unable to extract a reasonably good estimate for the distance d.

An improved method of target location may provide information regarding in which zone 108 of the vehicle 102 a vehicle occupant is physically interacting with in-vehicle component 106, as well as which personal device 104 is associated with the zone 108 occupant. As explained in detail herein, the method may be performed without distance estimates, while being robust with respect to interactions of personal devices 104 with in-vehicle components 106 located in close to equidistant location to multiple vehicle 102 occupants.

As shown in FIG. 1A, the rear driver-side passenger is reaching for the seat control in-vehicle component 106-H associated with the zone 108-C. Responsive to the rear driver-side passenger reaching for the in-vehicle component 106-H, the vehicle component interface application 118 installed to the personal device 104-B may display a user interface descriptive of the available features or providing other information related to the in-vehicle component 106-H. To do so however, the in-vehicle component 106-H may be required to identify which of the personal devices 104 within the vehicle 102 interior is the personal device 104-B of the user reaching for the in-vehicle component 106-H. Based on that identification, the in-vehicle component 106-H may notify the identified personal device 104-B via wireless connection 114 to activate the vehicle component interface application 118.

The mesh of in-vehicle components 106 and the personal devices 104 may be utilized to allow the in-vehicle components 106 to identify in which zone 108 each personal device 104 is located. As each of the in-vehicle components 106 is also associated with a zone 108, the in-vehicle components 106 may accordingly identify the personal device 104 to be notified as being the personal device 104 that is associated with the same zone 108 with which the in-vehicle component 106-H is associated. To continue the illustrated example, the vehicle component 106-H may utilize the mesh of in-vehicle components 106 to determine which of the personal devices 104 is the personal device 104 associated with the zone 108-C in which the vehicle component 106-H is located (i.e., personal device 104-B in the illustrated example).

As one possibility, the in-vehicle component 106-H may utilize signal strength 116 data received from the personal devices 104 in the vehicle 102 to identify which of the personal devices 104 is in use by the occupant physically interacting with the seating controls in-vehicle component 106-H. For instance, identifying the personal device 104 with the highest signal strength 116 at the in-vehicle component 106-H would likely identify the correct personal device 104-B, e.g., as follows:

$$\text{Personal Device} = i \Rightarrow \max_{i=1,n} RSSI_i \quad (5)$$

Figure 2:
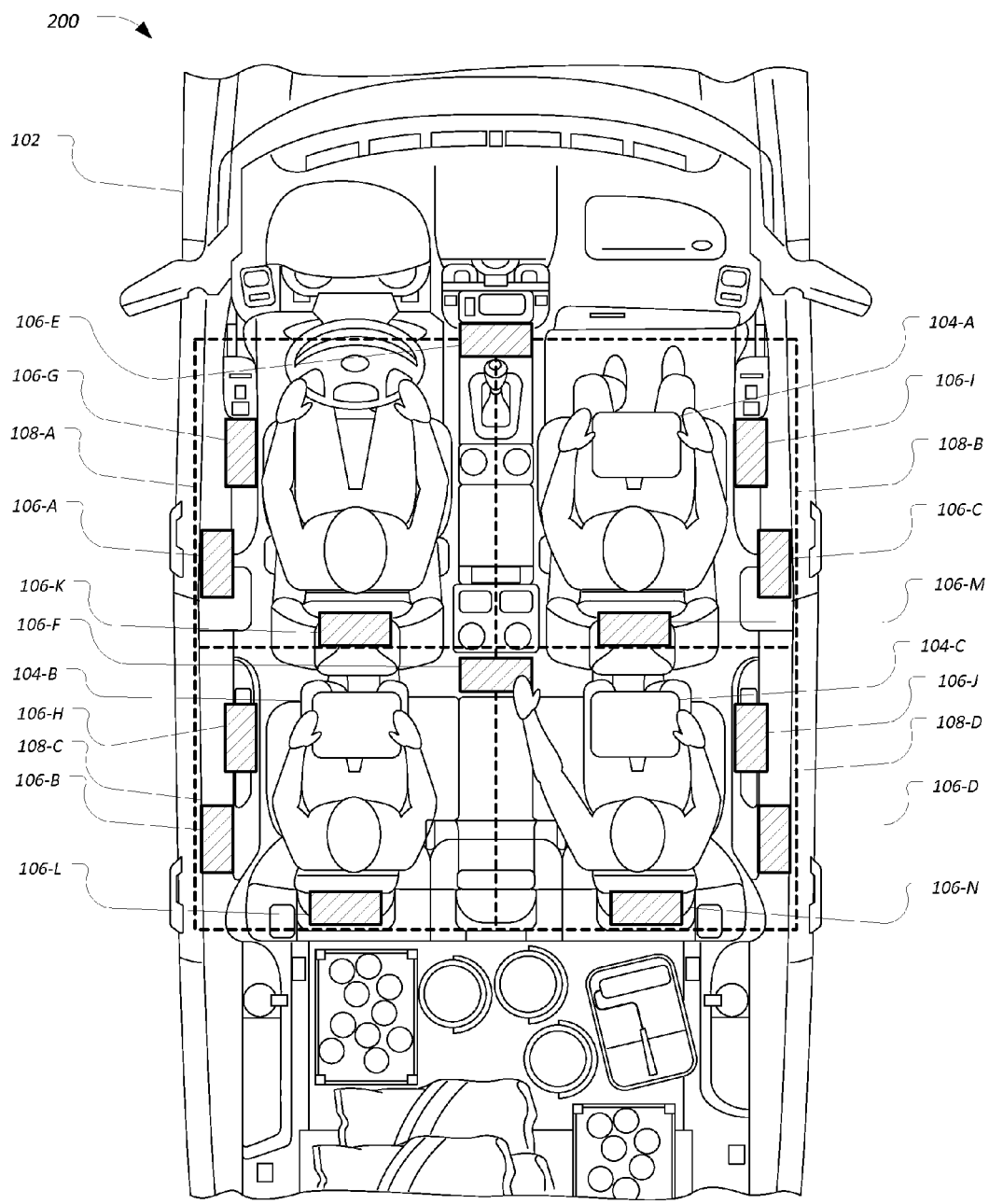
FIG. 2 illustrates an example system including a vehicle occupant interacting with a centrally-located in-vehicle component.

FIG. 2 illustrates an example system 200 including a vehicle occupant interacting with a centrally-located in-vehicle component 106. In the example system 100-A of FIG. 1A, the vehicle occupant of the zone 108-C is reaching for the seat control in-vehicle component 106-H which is relatively distant from the other vehicle occupants. However, as compared to the example of FIG. 1A, as shown in FIG. 2 the vehicle occupant in zone 108-D is reaching for the climate control in-vehicle component 106-F, which is located relatively centrally within the second row and within the vehicle 102 cabin generally.

The climate control in-vehicle component 106-F may include multiple switches/sensors, e.g., a first set of controls configured to adjust vent, temperature, heated/cooled seat, or other settings for the driver-side second row passenger and a second set of controls to adjust vent, temperature, heated/cooled seat, or other settings for the passenger-side second row passenger. The climate control in-vehicle component 106-F may be able to identify whether it was activated by select of controls for the driver-side rear zone 108-C or the passenger-side rear zone 108-D, but it may be unable to determine which of the personal devices 104 within the vehicle 102 is located within the zone controlled by the selected controls.

Moreover, the climate control in-vehicle component 106-F may be unable to determine from maximum signal strength 116 using equation (5) which of the personal devices 104 within the vehicle 102 is the personal device 104 of the user utilizing the controls of the climate control in-vehicle component 106-F. This may occur, as the climate control in-vehicle component 106-F is not unambiguously closer in distance one of the personal devices 104 over others of the personal devices 104. Other centrally-located in-vehicle components 106 may have similar issues, such as the speaker in-vehicle components 106-K through 106-N.

As an alternate approach, each of the personal devices 104 may attempt to identify which of the in-vehicle components 106 is closest to the respective personal device 104 by identifying to which of the in-vehicle components 106 the personal devices 104 provides the strongest signal strength 116. Each of the personal devices 104 may accordingly set itself to be associated with the zone 108 of the in-vehicle component 106 identified as having the strongest signal strength 116 at the personal device 104. However, such an approach may also provide incorrect or inconclusive results for cases in which the personal device 104 is relatively close to the center of the vehicle 102 or close to a zone 108 boundary, or for cases in which the signal strength 116 levels of the in-vehicle components 106 are un-calibrated with respect to one another.

To address these results, the personal devices 104 may be configured to determine an average signal strength 116 of the in-vehicle components 106 located within each zone 108, and associate the personal device 104 with the zone 108 with which the personal device 104 has the highest average signal strength 116. Accordingly, by considering the single strengths 116 of the in-vehicle components 106 by zone 108, a more accurate determination of zone 108 association of the personal devices 104 may be performed.

Figure 3:
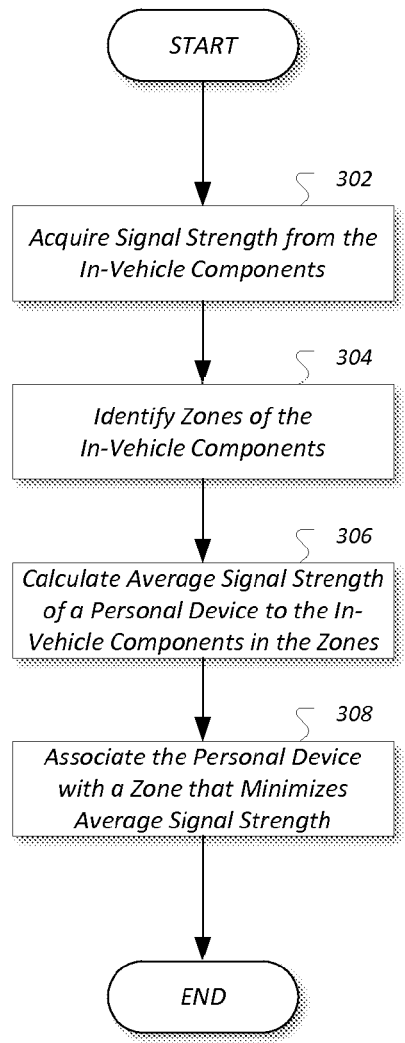
FIG. 3 illustrates an example process for using zone-coding of the in-vehicle components to assign personal devices to the zones of the vehicle.

FIG. 3 illustrates an example process 300 for using zone-coding of the in-vehicle components 106 to assign personal devices 104 to the zones 108 of the vehicle 102. The process 300 may be performed, in an example, by one or more of the in-vehicle components 106 within the vehicle 102 cabin, in communication with others of the in-vehicle components 106 and one or more personal devices 104. While the process 300 is described in terms of operation by one of the in-vehicle components 106, it should be noted that a similar process 300 may be performed by the personal device 104 acquiring signal strength 116 information from the in-vehicle components 106 and performing the zone 108 assignment.

At operation 302, the in-vehicle component 106 acquires signal strength 116 information from the personal devices 104. In an example, the in-vehicle component 106 may broadcast or otherwise send a request for signal strength 116 to the other in-vehicle components 106 of the vehicle 102. This request may cause the other in-vehicle components 106 to return wireless signal strength 116 data identified by their respective wireless transceiver 110 for the personal devices 104 that are detected.

At operation 304, the in-vehicle component 106 identifies the zones 108 associated with the in-vehicle components 106. In an example, each of the various in-vehicle components 106 present in the vehicle 102 interior may be associated with the one of the zones 108 in which the respective in-vehicle component 106 is located and/or the one (or more) of the zones 108 that is controlled by the respective in-vehicle component 106. In some examples, the other in-vehicle components 106 may further provide the zone 108 information to the in-vehicle component 106. In other examples, the in-vehicle component 106 may retrieve cached zone 108 information with respect to the zone 108 assignments of the in-vehicle components 106.

At operation 306, the in-vehicle component 106 calculates average signal strength 116 from the personal devices 104 according to zone 108. In an example, for each of the personal devices 104 included in the signal strength 116 information, the in-vehicle component 106 may compute an average signal strength 116 of the personal device 104 as detected by the in-vehicle components 106 located within each zone 108.

At operation 308 the in-vehicle components 106 associates the personal device 104 with the zone 108 that maximizes the average signal strength 116. In an example, if the personal device 104-A is determined to have the highest signal strength 116 to the in-vehicle components 106 in the zone 108-B, then the personal device 104-A may be associated with the zone 108-B. In another example, if the personal device 104-B is determined to have the highest signal strength 116 to the in-vehicle components 106 in the zone 108-C, then the personal device 104-B may be associated with the zone 108-C. Accordingly, by using average signal strength 116 information of the personal devices 104 across the zones 108, the in-vehicle component 106 may be able to assign the personal devices 104 to zones 108 more accurately than if signal strength 116 data from a single in-vehicle component 106 were used. After operation 308, the process 300 ends.

Figure 4:
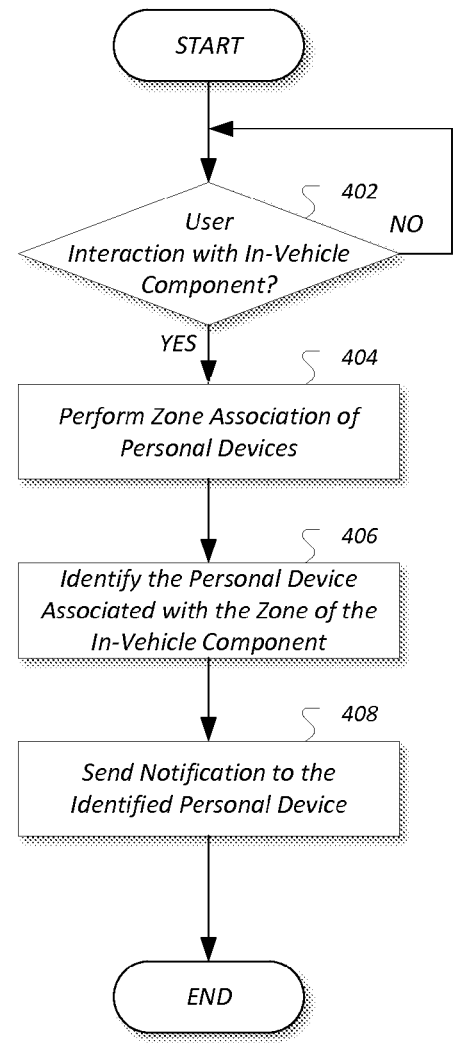
FIG. 4 illustrates an example process for activating the personal device associated with the zone of the in-vehicle component with which a user is interacting.

FIG. 4 illustrates an example process 400 for activating the personal device 104 associated with the zone 108 of the in-vehicle component 106 with which a user is interacting. The process 400 may be performed, in an example, by one of the in-vehicle components 106 within the vehicle 102 cabin.

At operation 402, the in-vehicle component 106 determines whether the user has interacted with the in-vehicle component 106. In an example, the in-vehicle component 106 may receive user input to the set of controls of the in-vehicle component 106 configured to receive input from the user with respect to basic or core functions of the in-vehicle component 106 (e.g., turn light on/off, turn speaker on/off, etc.). In another example, the in-vehicle component 106 may identify an increase in wireless signal strength 116 of a personal device 104 to the wireless transceiver 110. If a user interaction with the in-vehicle component 106 is detected control passes to operation 404. Otherwise the process 400 remains at operation 402.

At operation 404, the in-vehicle component 106 performs zone 108 association of the personal devices 104 within the vehicle 102. In an example, the zone 108 association may be performed using a process such as the process 300 described in detail above. In other examples, the in-vehicle component 106 may use a previously-determined zone 108 association of the personal devices 104, e.g., computed for a prior user interaction with the in-vehicle component 106 or with another of the in-vehicle components 106.

At operation 406, the in-vehicle component 106 identifies the personal device 104 associated with the zone 108 of the in-vehicle component 106. In an example, the in-vehicle components 106 may be associated with the one of the zones 108 in which the in-vehicle component 106 is located and/or the one (or more) of the zones 108 that is controlled by the in-vehicle component 106. Using the zone 108 of the in-vehicle component 106, the in-vehicle component 106 may look up or otherwise identify which of the personal devices 104 is associated with the same zone 108 as with which the in-vehicle component 106 is associated.

At operation 408, the in-vehicle component 106 sends a notification to the identified personal device 104. In an example, the in-vehicle component 106 utilize the wireless transceiver 110 of the in-vehicle component 106 to notify the identified personal device 104 via wireless connection 114 to activate the vehicle component interface application 118. After operation 408, the process 400 ends.

It should be noted that the lateration process 300 using "zone-coding" is only one example, and variations are possible. As a possibility, in some examples one or more of the in-vehicle components 106 may not be uniquely associated with just one seat or zone 108. For instance, one or more of the in-vehicle components 106 may be shared among two or more passengers sharing the same vehicle 102 row. In such an example, the in-vehicle component 106 may be coded as belonging to multiple zones 108. As one example, an in-vehicle component 106 central to the second row may be associated with zones 108-C and 108-D. When physical interaction is detected with an in-vehicle component 106 associated with multiple zones 108, if personal devices 104 are detected in more than one of the associated zones 108, a decision will need to be made whether to notify both in-vehicle components 106, neither of the in-vehicle components 106, or one of the in-vehicle components 106, e.g., based a history of past interactions.

In sum, by using a zone-coding of the in-vehicle components 106, and signal strength 116 information that is already available in many communication protocols, the in-vehicle components 106 may be able to assign zones 108 to personal devices 104 included within the vehicle 102. By using the zone 108 assignments of the in-vehicle components 106 and personal devices 104, one of the in-vehicle components 106 receives an indication of a user interaction with its controls, the in-vehicle component 106 may easily send a notification to the personal device 104 that is associated with the same zone 108 as the in-vehicle component 106 with which the user is interacting, thereby allowing the correct personal devices 104 to control the features of the in-vehicle components 106.

Computing devices described herein, such as the personal devices 104 and in-vehicle components 106, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
vehicle seating having zones associated with seating positions; and
in-vehicle components, each associated with at least one of the zones, each zone including a plurality of in-vehicle components, one of the in-vehicle components programmed to
identify a personal device associated with the zone of the in-vehicle component by determining average signal strength between the personal device and the plurality of in-vehicle components of each zone, and identifying for which zone the average signal strength of the respective plurality of in-vehicle components is highest, and
send a notification to the personal device responsive to a detected user interaction.

2. The system of claim 1, wherein the notification is configured to cause the personal device to invoke a vehicle component interface application to display a user interface for the in-vehicle component using the personal device.

3. The system of claim 1, wherein the zones include a first zone associated with a driver seating position, a second zone associated with a front passenger seating position, a third zone associated with a driver-side rear seating position, and a fourth zone associated with a passenger-side rear seating position.

4. The system of claim 3, wherein the zones further include a fifth zone associated with a driver-side third-row seating position, and a sixth zone associated with a passenger-side third-row seating position.

5. The system of claim 1, wherein the personal device includes one or more of a cellular telephone, a tablet computer, a smart watch, a laptop computer, a portable music player, a smartwatch, smart glasses, a fitness band, and a control ring.

6. The system of claim 1, wherein the detected user interaction includes receipt of user input to a set of user interface controls of the in-vehicle component.

7. The system of claim 1, wherein the in-vehicle component includes a wireless transceiver, and the detected user interaction includes identifying an increasing wireless signal intensity of a personal device to the wireless transceiver.

8. The system of claim 1, wherein the one of the in-vehicle components is further programmed to:
acquire wireless signal strength intensity information for personal devices from other of the in-vehicle components of the vehicle;
identify zones of the in-vehicle components;
calculate an average signal strength of the personal device to the in-vehicle components in each of the zones; and
associate the personal device with the zone having a highest average signal strength to the personal device.

9. A system comprising:
an in-vehicle component, associated with a zone seating position of a vehicle, programmed to
acquire wireless signal strength intensity information of a personal device from other in-vehicle components;
identify zones of the other in-vehicle components, each zone including a plurality of in-vehicle components;
for each of the zones, calculate an average signal strength of the personal device to the in-vehicle components in the zone; and
associate the personal device with the zone having a highest average signal strength to the personal device.

10. The system of claim 9, wherein each of the zones is associated with a respective seating position of the vehicle.

11. The system of claim 10, wherein the zones include a first zone associated with a driver seating position, a second zone associated with a front passenger seating position, a third zone associated with a driver-side rear seating position, and a fourth zone associated with a passenger-side rear seating position.

12. The system of claim 9, wherein the personal device is a cellular telephone.

13. The system of claim 9, wherein the in-vehicle component is further programmed to query other of in-vehicle components for the wireless signal strength intensity information of the personal device responsive to a detected user interaction.

14. The system of claim 13, wherein the detected user interaction includes receipt of user input to a set of user interface controls of the in-vehicle component.

15. A computer-implemented method comprising:
detecting user interaction to an in-vehicle component of a zone;
acquiring signal strength intensity information of personal devices from other in-vehicle components of the zone;
calculating average signal strengths of the personal devices to the in-vehicle components;
associating one of the personal devices to the zone as having a highest average signal strength to the in-vehicle components of the zone; and
sending a notification to the one of the personal devices.

16. The method of claim 15, further comprising associating each of respective seating position of the vehicle with a respective zone.

17. The method of claim 15, wherein the notification includes information requesting a vehicle component interface application to display a user interface for the in-vehicle component using the personal device.

18. The method of claim 15, wherein the personal device includes one or more of a cellular telephone, a tablet computer, a smart watch, a laptop computer, a portable music player, a smartwatch, smart glasses, a fitness band, and a control ring.

19. The method of claim 15, wherein the user interaction includes receiving user input to a set of user interface controls of the in-vehicle component.

20. A system comprising:
a memory; and
a processor programmed to:
for each seating zone of a vehicle, identify a plurality of in-vehicle components associated with the zone and average signal strength between the personal device and the plurality of in-vehicle components of the zone,
identify for which zone the average signal strength is highest, and
receive a notification responsive to a user interaction detected by one of the in-vehicle components of the zone.

\* \* \* \* \*